(12) United States Patent
Ratnagiri

(10) Patent No.: US 10,450,456 B2
(45) Date of Patent: Oct. 22, 2019

(54) POLYOXYMETHYLENE COMPOSITIONS

(71) Applicant: E I DU PONT DE NEMOURS AND COMPANY, Wilmington, DE (US)

(72) Inventor: Ramabhadra Ratnagiri, Wilmington, DE (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 90 days.

(21) Appl. No.: 15/789,203

(22) Filed: Oct. 20, 2017

(65) Prior Publication Data

US 2018/0142095 A1 May 24, 2018

Related U.S. Application Data

(60) Provisional application No. 62/425,258, filed on Nov. 22, 2016.

(51) Int. Cl.
| | | |
|---|---|---|
| *C08L 59/02* | (2006.01) | |
| *C08L 59/00* | (2006.01) | |
| *C08L 5/00* | (2006.01) | |
| *C08K 3/26* | (2006.01) | |
| *C08K 3/34* | (2006.01) | |

(52) U.S. Cl.
CPC .................. *C08L 59/00* (2013.01)

(58) Field of Classification Search
USPC .................................................. 524/47, 593
See application file for complete search history.

(56) References Cited

U.S. PATENT DOCUMENTS

| 5,011,890 | A | 4/1991 | Novak | |
|---|---|---|---|---|
| 6,642,289 | B2 | 11/2003 | Harashina et al. | |
| 6,736,967 | B2 * | 5/2004 | Ohnishi | B01D 15/3833 210/198.2 |
| 9,080,195 | B2 * | 7/2015 | O'Brien | C12P 19/18 |
| 10,131,782 | B2 * | 11/2018 | Nandi | C08L 59/02 |
| 2008/0090984 | A1 * | 4/2008 | Namikoshi | C08B 3/22 527/300 |
| 2018/0230241 | A1 * | 8/2018 | Johnson | D01F 9/00 |

FOREIGN PATENT DOCUMENTS

WO     94/14888 A1     7/1994

OTHER PUBLICATIONS

PCT International Search Report and Written Opinion for International Application No. PCT/US2017/058669 dated Jan. 22, 2018.

* cited by examiner

*Primary Examiner* — Tae H Yoon

(57) ABSTRACT

Polyoxymethylene compositions, articles comprising these compositions, and processes of making the compositions, comprising: a) at least one polyoxymethylene polymer; b) about 0.1 to about 5 wt. % of poly alpha-1,3-glucan having a d90 particle size of 50 microns or less; c) optionally, at least one additive selected from the group consisting of nucleating agents, waxes, ultraviolet stabilizers, colorants, antioxidants, formaldehyde scavengers, lubricants, and mixtures of these; wherein an article molded from said polyoxymethylene composition exhibits a formaldehyde emission of 1 weight percent or less when measured according to TEF test method.

15 Claims, No Drawings

POLYOXYMETHYLENE COMPOSITIONS

CROSS-REFERENCE TO RELATED APPLICATION

This application claims benefit of U.S. Provisional Application Ser. No. 62/425,258, filed on Nov. 22, 2016, the contents of which are hereby incorporated by references in their entirety.

OVERVIEW

Described herein are thermally stabilized polyoxymethylene compositions that exhibit, in the melt state, formaldehyde emissions of less than 1 weight percent.

Polyoxymethylene (POM, also known as polyacetal) compositions exhibit tribology, hardness, stiffness, toughness, coefficient of friction, solvent resistance, and the ability to crystallize rapidly that are particularly suitable to produce articles for demanding uses. However, during melt-processing, polyoxymethylenes can thermally degrade and release formaldehyde. Formaldehyde evolution, measured as thermally evolved formaldehyde (TEF), is an indirect measure of the heat stability of POM compositions.

Effort is frequently given to methods of reducing formaldehyde emissions in POM compositions during processing and/or from articles produced from the POM compositions. In particular, such efforts include adding one or more ingredients to POM compositions to reduce formaldehyde emissions, improve creep properties, impact resistance, etc. of the resultant article. Additives known to improve one property may reduce another property, so combining additives have recognized limitations. Improving formaldehyde emission can be achieved by adding formaldehyde scavengers such as allantoin compounds to POM compositions. However, addition of allantoin to POM compounds may reduce other physical properties, such as creep, which is undesirable.

U.S. Pat. No. 5,011,890 discloses POM compositions that contain polymers having formaldehyde reactive nitrogen groups such as polyacrylamide. U.S. Pat. No. 5,106,888 discloses polyacetal compositions that contain microcrystalline cellulose (MCC) as a thermal stabilizer with polyamide. U.S. Pat. No. 6,642,289 discloses POM compositions that contain an allantoin compound and optionally a basic nitrogen-containing compound and/or an antioxidant that contributes to stability, particularly heat stability, of polyacetal resins and suppression of formaldehyde emission.

Needed are polyoxymethylene compositions that, when in the melt state, exhibit a formaldehyde emission of less than 1 weight percent.

DETAILED DESCRIPTION

Definitions

As used herein, the terms "a", "an" refers to one, more than one and at least one and therefore does not necessarily limit its referent noun to the singular.

When these terms refer to a non-exclusive inclusion, a process, method, article, or apparatus that comprises a list of elements is not limited to the listed elements but may include other elements not expressly listed or which may be inherent. Further, unless expressly stated to the contrary, "or" refers to an inclusive, not an exclusive, or. For example, a condition A or B is satisfied by any one of the following: A is true (or present) and B is false (or not present), A is false (or not present) and B is true (or present), and both A and B are true (or present).

As used herein, the term "article" refers to an unfinished or finished item, thing, object, or an element or feature of an unfinished or finished item, thing or object. As used herein, when an article is identified as unfinished, the term "article" may refer to any item, thing, object, element, device, etc. that will be included in a finished article and/or will undergo further processing in order to become a finished article.

An article may comprise one or more element(s) or subassembly(ies) that either are partially finished and awaiting further processing or assembly with other elements/subassemblies that together will comprise a finished article.

As used herein, the terms "polyoxymethylene" and "polyacetal" includes homopolymers of formaldehyde or of cyclic oligomers of formaldehyde, the terminal groups of which are end-capped by esterification or etherification, and co-polymers of formaldehyde or of cyclic oligomers of formaldehyde and other monomers that yield oxyalkylene groups with at least two adjacent carbon atoms in the main chain, the terminal groups of which co-polymers can be hydroxyl terminated or can be end-capped by esterification or etherification.

As used herein, the term "nucleating agent" refers to any particulate material that nucleates polyoxymethylene. The nucleating agent can be organic or inorganic and has an average particle size of 100 microns or less.

As used herein, the term "formaldehyde scavenger" refers to any organic cyclic compound having an active imino group which has a high capacity to form a methylol group by reacting with formaldehyde.

As used herein, the term "antioxidant" refers to a monocyclic hindered phenol compound, a polycyclic hindered phenol compound bonded by a hydrocarbon group or a group containing sulfur atom, and a hindered phenol compound having an ester group or amide group.

As used herein, the term "melt flow rate" or "melt index" refers to a measure of the flow of a thermoplastic polymer in the melt and is defined as the mass of polymer, in grams, flowing in ten minutes through a capillary of a specific diameter and length at a certain pressure and temperature measured according to ISO 1133. Melt flow rate is an indirect measure of the molecular weight of a polymer.

As used herein, the term "melt state" or "in the melt state" refer to a polyoxymethylene composition which has been heated to its melting point or above its melting point.

As used herein, the term "emitted formaldehyde" or "formaldehyde emission" refers to that formaldehyde which evolves from polyoxymethylene compositions while in the melt state as measured according to the TEF test method and recorded as weight percent formaldehyde.

Ranges

Any range set forth herein includes its endpoints unless expressly stated otherwise. Setting forth an amount, concentration, or other value or parameter as a range specifically discloses all ranges formed from any pair of any upper range limit and any lower range limit, regardless of whether such pairs are separately disclosed herein. To the point, the ranges in the compositions and articles described herein are not limited to specific pairs of upper and lower limits disclosed in the description.

Preferred Variants

The setting forth of variants in terms of materials, methods, steps, values, ranges, etc.—whether identified as preferred variants or not—of the compositions and articles described herein is specifically intended to disclose any composition and article that includes any combination of such materials, methods, steps, values, ranges, etc. Such combinations are specifically intended to be preferred variants of the compositions and articles described herein.

Abbreviations

As used herein, "weight percent" is abbreviated as "wt %".

As used herein, "polyoxymethylene" is abbreviated as "POM".

As used herein, "grams per minute" is abbreviated as "g/min".

Generally: Compositions Described Herein

Disclosed herein are polyoxymethylene compositions that, when in the melt state, exhibit a formaldehyde emission of 1 weight percent or less, preferably 0.6 weight percent or less. It has surprisingly been found that when a specific polysaccharide based material is added to the polyoxymethylene composition, the formaldehyde emissions is significantly reduced relative to polyoxymethylene composition lacking said polysaccharide based material.

Specifically disclosed herein are polyoxymethylene compositions comprising:
  a) at least one polyoxymethylene polymer;
  b) about 0.1 to about 5 wt. % of poly alpha-1,3-glucan;
  c) optionally, at least one additive selected from the group consisting of nucleating agents, waxes, ultraviolet stabilizers, colorants, antioxidants, formaldehyde scavengers, lubricants, and mixtures of these;
wherein said polyoxymethylene composition exhibits a formaldehyde emission of 1 weight percent or less when measured according to the TEF test method; and
wherein said particle size is measured according to ISO 13320:2009.

Also disclosed herein are articles made of these compositions and processes of making the compositions and articles.

Further disclosed herein are processes of making a polyoxymethylene composition comprising the step of mixing:
  a) at least one polyoxymethylene polymer;
  b) about 0.1 to about 5 wt. % of poly alpha-1,3-glucan having a d90 particle size of 50 microns or less measured according to ISO 13320:2009;
  c) optionally, at least one additive selected from the group consisting of nucleating agents, waxes, ultraviolet stabilizers, colorants, antioxidants, formaldehyde scavengers, lubricants, and mixtures of these;
to prepare a polyoxymethylene composition,
wherein said polyoxymethylene composition exhibits a formaldehyde emission of 1 weight percent or less when measured according to the TEF test method.

a) Polyoxymethylene (POM) Polymer

The polyoxymethylene (also known as polyacetal) in the compositions described herein may be one or more homopolymers, copolymers, or mixtures of these. Homopolymers are prepared by polymerizing formaldehyde or formaldehyde equivalents, such as cyclic oligomers of formaldehyde.

Copolymers may contain one or more co-monomers generally used in preparing polyoxymethylene compositions, which include acetals and cyclic ethers that lead to the incorporation into the polymer chain of ether units with 2-12 sequential carbon atoms. If a copolymer is used in these compositions, the quantity of co-monomer will not be more than 20 weight percent, preferably not more than 15 weight percent, and most preferably about two weight percent. Preferable comonomers are 1,3-dioxolane, ethylene oxide, and butylene oxide, where 1,3-dioxolane is more preferred, and preferable polyoxymethylene copolymers are copolymers where the quantity of co-monomer is about 2 weight percent.

It is also preferred that the homo- and copolymers are: 1) homopolymers whose terminal hydroxy groups are end-capped by a chemical reaction to form ester or ether groups; or, 2) copolymers that are not completely end-capped, but that have some free hydroxy ends from the co-monomer unit or are terminated with ether groups. Suitable end groups for homopolymers are acetate and methoxy and preferred end groups for copolymers are hydroxy and methoxy.

The polyoxymethylene used in the compositions described herein may be branched or linear and generally have a number average molecular weight of at least 10,000, preferably 20,000-90,000. The molecular weight may be conveniently measured by gel permeation chromatography in m-cresol at 160° C. using a DuPont PSM bimodal column kit with nominal pore size of 60 and 1000 angstrom. The molecular weight may also be measured by determining the melt flow using ASTM D1238 or ISO 1133. The melt flow will be in the range of 0.1 to 100 g/10 min, preferably from 0.5 to 100 g/10 min, more preferably from 2 to 60 g/10 min, and most preferably from 2 to 40 g/10 min for injection molding purposes.

The amount of POM in these compositions ranges from about 85 to about 99.9, preferably from 90 to 99.5, more preferably from 97 to 99, and most preferably from 98 to 99.5 weight percent of the total weight of the composition.

b) Poly Alpha-1,3-Glucan

Component (b) in the polyoxymethylene compositions described herein is poly alpha-1,3-glucan. Poly alpha-1,3-glucan is a polymer comprising glucose monomeric units linked together by glycosidic linkages, wherein at least about 50% of the glycosidic linkages are alpha-1,3-glycosidic linkages. Poly alpha-1,3-glucan is a type of polysaccharide. The 1,3-linkage of the poly alpha-1,3-glucan can be illustrated as follows wherein n is an integer of at least 6 or more:

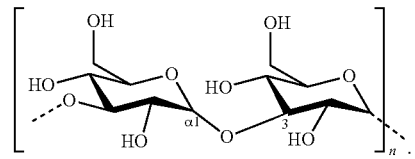

The poly alpha-1,3-glucan in the polyoxymethylene compositions described herein is a solid having a particle size of from about 50 to 0.1 microns, preferably from 25 to 0.5 microns, and more preferably from 10 to 0.5 microns when measured according to ISO 13320:2009. Most preferably the poly alpha-1,3-glucan particles in the polyoxymethylene compositions described herein have a d90 of less than 50 microns.

The poly alpha-1,3-glucan described herein can be prepared by extracting it from various organisms, such as fungi, that produce poly alpha-1,3-glucan. Alternatively, poly alpha-1,3-glucan can be enzymatically produced from sucrose using one or more glucosyltransferase (gtf) enzymes (e.g., gtfJ), such as described in U.S. Pat. Nos. 7,000,000 and 9,139,718, both of which are incorporated herein by reference.

The concentration of poly alpha-1,3-glucan in the polyoxymethylene compositions described herein may range from about 0.1 to 20 weight percent, preferably from 0.2 to 15 weight percent, and more preferably from about 0.2 to 1 weight percent.

c) Additives

Optional additives which may be added to the polyoxymethylene compositions described herein include any material which does not increase the formaldehyde emissions of the polyoxymethylene composition above 1 weight percent when measured according to the TEF test.

Examples of such additives include nucleating agents, waxes, ultraviolet stabilizers, colorants, antioxidants, formaldehyde scavengers, lubricants, and mixtures of these.

Examples of nucleating agents include any particulate material that nucleates polyoxymethylene. Preferably, the nucleating agent is selected from titanium oxides, boron compounds, such as boron nitride, silica, silicates, montmorillonite, calcium carbonate, valentinite, pyrophyllite, dolomite, organic or inorganic pigments, melamine-formaldehyde condensates, phyllosilicates, talc, powdered sulfates or carbonates, terpolymers of trioxane, and ethylene oxide and butanediol diglycidyl ethers. Preferred nucleating agents include talc, boron nitride and terpolymers of trioxane. The nucleating agent may have an average particle size of 100 microns or less, preferably 10 microns or less, more preferably 5 microns or less, and most preferably 1 micron or less. When used, the amounts of nucleating agent in the polyoxymethylene compositions ranges from 0.01 to 0.9, preferably from 0.01 to 0.7, more preferably from 0.02 to 0.5, and most preferably from 0.02 to 0.4 weight percent of the total weight of the polyoxymethylene composition.

Examples of optional formaldehyde scavengers which may be used in the polyoxymethylene compositions include organic cyclic compounds having an active imino group. Examples of organic cyclic compounds having an active imino group include hydantoins and imidazole compounds such as hydantoin, dimethylhydantoin (e.g., 5,5-dimethylhydantoin) and allantoin. When used, the amount of formaldehyde scavenger in the polyoxymethylene compositions ranges from 0.01 to 0.5, preferably from 0.03 to 0.4, more preferably from 0.05 to 0.4, and most preferably from 0.1 to 0.3 weight percent of the total weight of the composition.

Examples of antioxidants which may be used in the polyoxymethylene compositions described herein include hindered phenol-based antioxidants. The hindered phenol-based antioxidants include a monocyclic hindered phenol compound, a polycyclic hindered phenol compound bonded by a hydrocarbon group or a group containing sulfur atom, and a hindered phenol compound having ester group or amide group. Preferred examples of hindered phenol antioxidant compounds include pentaerythrityl tetrakis[3-(3,5-di-tert-butyl-4-hydroxyphenyl)propionate] (Irganox 1010), triethylene glycol bis[3-(3-tert-butyl-4-hydroxy-5-methylphenyl)propionate] (Irganox 245), 3,3'-bis[3-(3,5-di-tert-butyl-4-hydroxyphenyl)propionohydrazide] (Irganox MD 1024), hexamethylene glycol bis[3-(3,5-di-tert-butyl-4-hydroxyphenyl)propionate] (Irganox 259), N,N'-(Hexane-1,6-diyl)bis(3,5-di-tert-butyl-4-hydroxybenzenepropanamide) (Irganox 1098) and 3,5-di-tert-butyl-4-hydroxytoluene (Lowinox BHT). Preferred hindered phenol antioxidants are Irganox 1010, Irganox 245, Irganox 1098 or combinations of these. When used, the amount of antioxidant in the polyoxymethylene compositions ranges from 0.02 to 0.5, preferably from 0.05 to 0.4, more preferably from 0.1 to 0.4, and most preferably from 0.1 to 0.3 weight percent of the total weight of the polyoxymethylene composition.

Suitable lubricant additives include silicone lubricants such as dimethylpolysiloxanes and their derivatives; oleic acid amides; alkyl acid amides. Other suitable additives include non-ionic surfactant lubricants; hydrocarbon waxes; chlorohydrocarbons; fluorocarbons; oxy-fatty acids; esters such as lower alcohol esters of fatty acids; polyvalent alcohols such as polyglycols and polyglycerols; and metal salts of fatty acids, such as lauric acid and stearic acid. Suitable ultraviolet light stabilizers include benzotriazoles, benzophenones, aromatic benzoates, cyano acrylates, and oxalic acid anilides.

Properties of Polyoxymethylene Compositions Described Herein

Polyoxymethylene compositions are used in the manufacture of molded articles, such as gears, safety restraint parts, and especially for use in automotive applications. During manufacture of articles prepared from these polyoxymethylene compositions, formaldehyde may be released, especially when high temperatures are required during manufacture of articles. Because formaldehyde is labeled as a carcinogen in many countries, such formaldehyde emissions are undesirable. Efforts to reduce formaldehyde emissions include adding one or more ingredients to polyoxymethylene compositions to reduce formaldehyde emissions.

The polyoxymethylene compositions described herein exhibit a surprising decrease in formaldehyde emissions compared to polyoxymethylene compositions not comprising poly alpha-1,3-glucan. When polysaccharides such as amylopectin are added to the polyoxymethylene compositions described herein, the formaldehyde emissions are considerably higher than when poly alpha-1,3-glucan is used.

It has also been surprisingly found that when the particle size of the poly alpha 1,3-glucan is less than about 50 microns, the formaldehyde emissions are less than about 1 wt % TEF. When the poly alpha-1,3-glucan particle size is greater than about 50 microns, the formaldehyde emissions are greater than 1 wt % TEF.

Methods of Making the Compositions Described Herein

The polyoxymethylene compositions described herein may be made by melt-blending the components using any known methods. The component materials may be mixed to homogeneity using a melt-mixer such as a single or twin-screw extruder, blender, kneader, Banbury mixer, etc. to give a resin composition. Or, part of the materials may be mixed in a melt-mixer, and the rest of the materials may then be added and further melt-mixed until homogeneous. When adding the components in a stepwise fashion, part any component and any other component may be first added and melt-mixed with the remaining components and further melt-mixed until a well-mixed composition is obtained. The melt-mixing can result in pellets, which can be extruded or molded into articles.

Articles Comprising the Compositions Described Herein

The compositions described herein may be molded into articles using any suitable melt-processing technique known in the art, such as injection molding, extrusion molding, blow molding, and injection blow molding. Injection blow molding and injection molding are more preferred with injection molding most preferred. In addition, these compositions may be formed into films and sheets by extrusion to result in either cast and/or blown films. Such sheets may be further thermoformed into articles and structures that may be oriented from the melt or at a later stage in processing.

These compositions may also be used to form fibers and filaments that may be oriented from the melt or at a later stage in processing. Articles comprising these compositions include, without limitation, gears, toys, cigarette lighter bodies, writing pen bodies, conveyor belt parts, safety restraint parts, car interior parts, automotive fasteners, retractors, sliding members, snap-fit buckles, and zippers.

Examples

The exemplary compositions identified by "E" in the tables below are intended only to further illuminate and not to limit the scope of compositions, methods, and articles described and recited herein. Comparative examples are identified in the tables below by "C".

Materials

In the compositions listed in the tables below, the following materials were used:

POM: Delrin® 500 acetal homopolymer having a melt flow index (190° C.; 2.16 kg. ISO 1133) of 12 g/10 min., available from E.I. DuPont de Nemours and Company, Wilmington, Del., USA [DuPont].

Amide polymer: a polyacrylamide thermal stabilizer available as MAP 1070, a 20 weight percent polyethylene glycol coated polyacrylamide.

Polyamide: PA 66/610/6 polyamide terpolymer (33/23/43 mol %) is a thermal stabilizer with melting point of 150-160° C. and is ground prior to compounding to pass a 20 MESH screen.

EVA: An ethylene vinyl alcohol copolymer comprising 29 mole percent ethylene available as Soarnol™ D from Nippon Gohsei.

Amylopectin: available from MP Biomedicals, LLC, Solon Ohio, USA [CAS#9037-22-3]

Poly alpha-1,3-glucan: Enzymatically produced from sucrose using one or more glucosyltransferase (gtf) enzymes (e.g., gtfJ). Prepared according to example 6 of U.S. Pat. No. 9,080,195 using a gtfJ enzyme. This poly alpha-1,3-glucan was then ground cryogenically in various particle sizes and used in the examples and comparative examples as Glucan A to C.

Glucan A: d90 particle size less than 10 microns
Glucan B: d90 particle size less than 45 microns
Glucan C: d90 particle size less than 180 microns
Soarnol A: ethylene vinyl alcohol polymer (56 mol % vinyl alcohol) from Nippon Gohsei
Antioxidant: Irganox 245 available from BASF
Lubricant: ethylene bisstearamide available as Acrawax C from Lonza Chemicals
MC-1: Microcrystalline Cellulose 1 having a particle size of less than 50 microns (d90) available as Grinsted® MCC powder from Dupont Nutrition and Health, Wilmington, Del., USA
MC-2: Microcrystalline Cellulose 2 having particle size greater than 40% 200 mesh (about 75 microns) available as MCC powder from Sigma Aldrich Methods In the compositions listed in the tables below, the following methods were used:

Melt Flow Rate

Melt Flow Index or Melt Flow Rate was determined using ISO 1133 and reported as grams/10 minute (190° C.; 2.16 kg.).

Particle Size

Particle Size Distribution (PSD) was measured using a Malvern Mastersizer 2000 (Malvern Instruments, Westborough Mass.) Laser Diffraction device to which was attached a Malvern Sirocco dry powder disperser unit according to ISO 13320:2009, (Particle size analysis—Laser diffraction methods"). The powder test sample was loaded into the Sirocco's vibratory feeder and dispersed in an air stream with a pressure setting of 2 bar. The dispersed powder was transported through the Mastersizer by the air stream. Particle size distribution is a volume-weighted size distribution and the results include the mass median size (d50) as well as the $10^{th}$ (d10) and 90th (d90) percentiles of the PSD.

For example, a sample having a particle size of less than 60 microns indicates that 90 percent of the particles have a particle size of less than 60 microns and is recorded as d90 less than 60.

Formaldehyde Emissions

Formaldehyde emissions or thermally emitted formaldehyde from articles formed from the polyoxymethylene compositions described herein are determined according to the following TEF test procedure. The TEF test method has been tailored to determine formaldehyde emissions of polyoxymethylene compositions in the melt state.

The melt stability of the polyoxymethylene compositions was determined by heating pellets of the polyoxymethylene compositions under nitrogen for 30 minutes at a temperature of 259° C. The formaldehyde evolved during this time period was swept by a stream of nitrogen into a titration vessel containing a sufficient quantity of sodium sulfite solution to absorb the formaldehyde. The formaldehyde reacted with the sodium sulfite to generate sodium hydroxide. The generated sodium hydroxide was continuously titrated with hydrochloric acid to maintain the original pH. The total volume of acid used was plotted as a function of time. The total volume of acid consumed at 30 minutes was proportional to the formaldehyde generated by the heated polyoxymethylene composition and was a quantitative measure of melt stability. The percent melt stability (referred to as TEF) was calculated by the following formula:

$$\text{TEF } (\%) = (V_{30} \times N \times 3.003)/S$$

where $V_{30}$=the total volume in mL of acid consumed at 30 minutes, N=the normality of the acid, 3.003=(30.03 (the molecular weight of formaldehyde)×100)/(1000 mg/g), and S=the sample weight in grams.

The results are shown in Tables 1 and 2 under the heading of "TEF".

Discussion of Results

TABLE 1

| | Composition | | | | | | |
|---|---|---|---|---|---|---|---|
| | C1 | C2 | C3 | C4 | C5 | C6 | C7 |
| POM | 100 | 99.5 | 99 | 99.5 | 99 | 99.5 | 99 |
| Amide polymer | | 0.5 | 1 | | | | |
| Polyamide | | | | 0.5 | 1 | | |
| EVA | | | | | | 0.5 | 1 |
| Physical Properties | | | | | | | |
| TEF (wt. %) | 3.44 | 0.78 | 0.48 | 0.91 | 0.78 | 0.80 | 1.03 |

C2 to C7 in Table 1 show the effect on formaldehyde emissions when various materials are used which are known to decrease formaldehyde emissions of polyoxymethylene compositions. C3 provides the lowest formaldehyde emissions at 0.48 weight percent when used at 1 weight percent. C1 is polyoxymethylene without any additives and is used as a control.

TABLE 2

| | Composition | | | |
|---|---|---|---|---|
| | C8 | C9 | E1 | E2 |
| POM | 99.5 | 99 | 99.5 | 99 |
| Amylopectin | 0.5 | 1 | | |
| Glucan A | | | 0.5 | 1 |
| Physical Properties | | | | |
| TEF (wt. %) | 0.72 | 0.87 | 0.59 | 0.45 |

Table 2 shows the effect on formaldehyde emissions of polyoxymethylene compositions in the melt state when two different polysaccharide based materials are added to the composition. When amylopectin is added, the formaldehyde emissions is reduced relative to the control to 0.72 weight percent. However, when poly alpha-1,3-glucan is added to the composition, there is a surprising further reduction in formaldehyde emissions to 0.59 weight percent. This is an improvement of at least 18 percent relative to the use amylopectin at the same concentration and an improvement of more than 50 percent relative to amylopectin when both materials are added at one percent to the polyoxymethylene composition.

Poly alpha-1,3-glucan, when added to polyoxymethylene at 0.5 weight percent exhibits the lowest formaldehyde emissions of any material tested at 0.59 weight percent.

TABLE 3

| | Composition | | | | |
|---|---|---|---|---|---|
| | E3 | E4 | C10 | C11 | C12 |
| POM | 99.25 | 99.25 | 99.25 | 99.25 | 99.25 |
| Soarnol A | 0.05 | 0.05 | 0.05 | 0.05 | 0.05 |
| Antioxidant | 0.1 | 0.1 | 0.1 | 0.1 | 0.1 |
| Lubricant | 0.15 | 0.15 | 0.15 | 0.15 | 0.15 |
| Glucan A | 0.45 | | | | |
| Glucan B | | 0.45 | | | |
| Glucan C | | | 0.45 | | |
| MC-1 | | | | 0.45 | |
| MC-2 | | | | | 0.45 |
| Physical Properties | | | | | |
| TEF (wt. %) | 0.7 | 0.9 | 1.7 | 3.8 | 3.8 |

Table 3 shows the effect poly alpha-1,3-glucan particle size has on TEF emissions of a polyoxymethylene composition comprising an antioxidant, a lubricant, and an ethylene vinyl alcohol copolymer. E3 and E4 have poly alpha-1,3-glucan particle sizes of less than 10 and 45 microns respectively. Both E3 and E4 exhibit TEF values of less than 1 percent. When the poly alpha-1,3-glucan particle size is greater than 50 microns the TEF values increase. C10 comprises a poly alpha-1,3-glucan having a particle size of less than 180 microns (d90) and the TEF values are 1.7 percent.

C11 and C12 are comparative examples in which the poly alpha-1,3-glucan is replaced with microcrystalline celluloses and the TEF values are at least 200 percent greater than E3 and E4 which comprise the poly alpha-1,3-glucans disclosed herein. These results show that it is only when specific polysaccharides are used in polyoxymethylene compositions that the resulting TEF values are less than about 1 percent.

What is claimed is:

1. A polyoxymethylene composition comprising:
   a) at least one polyoxymethylene polymer;
   b) about 0.1 to about 5 wt. % of poly alpha-1,3-glucan having a d90 particle size of 50 microns or less;
   c) optionally, at least one additive selected from the group consisting of nucleating agents, waxes, ultraviolet stabilizers, colorants, antioxidants, formaldehyde scavengers, lubricants, and mixtures of these;
   wherein said polyoxymethylene composition exhibits a formaldehyde emission of 1 weight percent or less when measured according to the TEF test method; and
   wherein said particle size is measured according to ISO 13320:2009.

2. The polyoxymethylene composition of claim 1, wherein the formaldehyde emission is 0.7 weight percent or less.

3. The polyoxymethylene composition of claim 1, wherein the formaldehyde emission is 0.6 weight percent or less.

4. The polyoxymethylene composition of claim 1, wherein the at least one additive is present.

5. The polyoxymethylene composition of claim 4, wherein the additive comprises a nucleating agent selected from the group consisting of titanium oxides, boron compounds, silica, silicates, montmorillonite, valentinite, pyrophyllite, dolomite, melamine-formaldehyde condensates, phyllosilicates, talc, sulfates, carbonates, terpolymers of trioxane, and mixtures of these.

6. The polyoxymethylene composition of claim 5, wherein said carbonates is calcium carbonate.

7. The polyoxymethylene composition of claim 4, wherein the additive comprises a formaldehyde scavenger selected from the group consisting of hydantoin compounds, imidazole compounds, and mixtures of these.

8. The polyoxymethylene composition of claim 4, wherein the additive comprises an antioxidant selected from hindered phenol antioxidants.

9. The polyoxymethylene composition of claim 4, wherein the additive comprises a lubricant.

10. The polyoxymethylene composition of claim 1, wherein:
    the polyoxymethylene polymer has a melt flow rate of from about 0.5 g/10 min. to about 100 g/10 min. when measured according to ISO 1133.

11. The polyoxymethylene composition of claim 1 wherein the polyoxymethylene polymer is a copolymer.

12. The polyoxymethylene composition of claim 1 wherein the polyoxymethylene polymer is a homopolymer.

13. An article comprising the polyoxymethylene composition of claim 1.

14. The article of claim 13 in the form of gears, toys, cigarette lighter bodies, writing pen bodies, conveyor belt parts, safety restraint parts, car interior parts, automotive fasteners, retractors, sliding members, snap-fit buckles, and zippers.

15. A process of making a polyoxymethylene composition comprising the step of mixing:
    a) at least one polyoxymethylene polymer;
    b) about 0.1 to about 5 wt. % of poly alpha-1,3-glucan having a d90 particle size of 50 microns or less measured according to ISO 13320:2009;

c) optionally, at least one additive selected from the group consisting of nucleating agents, waxes, ultraviolet stabilizers, colorants, antioxidants, formaldehyde scavengers, lubricants, and mixtures of these;
to prepare a polyoxymethylene composition,
wherein said polyoxymethylene composition exhibits a formaldehyde emission of 1 weight percent or less when measured according to the TEF test method.

* * * * *